United States Patent
Jeon

(10) Patent No.: US 12,450,772 B2
(45) Date of Patent: Oct. 21, 2025

(54) METHOD AND SYSTEM FOR GENERATING VISUAL FEATURE MAP

(71) Applicant: NAVER LABS CORPORATION, Seongnam-si (KR)

(72) Inventor: Junho Jeon, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 408 days.

(21) Appl. No.: 18/070,256

(22) Filed: Nov. 28, 2022

(65) Prior Publication Data

US 2023/0108621 A1 Apr. 6, 2023

Related U.S. Application Data

(63) Continuation of application No. PCT/KR2021/001955, filed on Feb. 16, 2021.

(30) Foreign Application Priority Data

May 28, 2020 (KR) .................. 10-2020-0064244

(51) Int. Cl.
  *G06V 10/77* (2022.01)
  *G01S 17/894* (2020.01)
  *G06T 7/73* (2017.01)

(52) U.S. Cl.
  CPC ............. *G06T 7/74* (2017.01); *G01S 17/894* (2020.01); *G06V 10/7715* (2022.01); *G06T 2200/04* (2013.01); *G06T 2207/10028* (2013.01); *G06T 2207/30252* (2013.01)

(58) Field of Classification Search
  CPC ............... G06T 7/74; G06T 2200/04; G06T 2207/10028; G06T 2207/30252; G01S 17/894; G06V 10/7715
  See application file for complete search history.

(56) References Cited

U.S. PATENT DOCUMENTS

| | | | |
|---|---|---|---|
| 9,349,180 B1 * | 5/2016 | Ramaswamy | G06V 10/464 |
| 9,378,554 B2 * | 6/2016 | Chang | G05D 1/0248 |
| 2015/0117785 A1 * | 4/2015 | Lee | G06V 10/462 382/195 |
| 2016/0104289 A1 | 4/2016 | Chang et al. | |
| 2020/0230820 A1 | 7/2020 | Watanabe et al. | |

FOREIGN PATENT DOCUMENTS

| | | | | |
|---|---|---|---|---|
| JP | 04273119 | 3/2009 | | |
| KR | 1020110011424 | 2/2011 | | |
| KR | 1020150047950 | 5/2015 | | |
| KR | 1618030 B1 * | 5/2016 | | |
| WO | WO-2005038402 A1 * | 4/2005 | ............ | G01C 21/28 |
| WO | 2019073795 A1 | 4/2019 | | |

* cited by examiner

*Primary Examiner* — Gregory A Morse
*Assistant Examiner* — Renae A Bitor
(74) *Attorney, Agent, or Firm* — GREER BURNS & CRAIN, LTD.

(57) ABSTRACT

A method for generating a visual feature map includes receiving a first image, detecting a first set of keypoints from the first image, extracting a visual feature descriptor of each of the first set of keypoints, receiving a first set of 3D point cloud data associated with a location where the first image is captured, and determining a 3D coordinate value of each of the first set of keypoints using the first set of 3D point cloud data.

16 Claims, 10 Drawing Sheets

METHOD AND SYSTEM FOR GENERATING VISUAL FEATURE MAP

CROSS-REFERENCE TO RELATED APPLICATION

This application is a continuation of International Patent Application No. PCT/KR2021/001955 filed on Feb. 16, 2021, which is based upon and claims the benefit of priority to Korean Patent Application No. 10-2020-0064244, filed on May 28, 2020. The disclosures of the above-listed applications are hereby incorporated by reference herein in their entirety.

BACKGROUND OF THE INVENTION

Field of Invention

The present disclosure relates to a method and a system for generating a visual feature map, and more particularly, to a method and a system for generating a visual feature map including visual information and geometric information.

Description of Related Art

In recent years, business models that provide services based on the locations of vehicles have been increasing. As a representative example, automotive navigation services are provided and users of the services are steadily increasing. For these services, it is important to accurately locate the automobiles. In particular, with the introduction of autonomous vehicles, researches to improve the accuracy of vehicle location estimation technology are actively conducted.

In such an environment, fine location estimation mainly requires expensive equipment such as a LiDAR sensor, a RADAR sensor, a high-precision GPS module, an IMU sensor, and the like. These expensive sensors are an obstacle to the popularization of autonomous vehicles. Accordingly, there is a need for technology capable of reducing dependence on expensive sensors and estimating a vehicle location with high accuracy.

BRIEF SUMMARY OF THE INVENTION

In order to address one or more problems (e.g., the problems described above and/or other problems not explicitly described herein), the present disclosure provides a method for, a non-transitory computer-readable recording medium storing instructions for, and an apparatus (system) for generating a visual feature map. In addition, a method and an apparatus (system) for estimating a location are provided, which are capable of recognizing the location and posture of a vehicle using an image captured by a camera.

The present disclosure may be implemented in a variety of ways, including a method, an apparatus (system), or a non-transitory computer-readable storage medium recording instructions.

A method for generating a visual feature map is provided, which may be performed by one or more processors and include receiving a first image, detecting a first set of keypoints from the first image, extracting a visual feature descriptor of each of the first set of keypoints, receiving a first set of 3D point cloud data associated with a location where the first image is captured, and determining a 3D coordinate value of each of the first set of keypoints using the first set of 3D point cloud data.

A computer program is provided, which is stored on a computer-readable recording medium for executing, on a computer, the method for generating the visual feature map described above.

A system for generating a visual feature map is provided, which may include a memory, and one or more processors connected to the memory and configured to execute one or more computer-readable programs included in the memory, in which the one or more programs may include instructions for receiving a first image, detecting a first set of keypoints from the first image, extracting a visual feature descriptor of each of the first set of keypoints, receiving a first set of 3D point cloud data associated with a location where the first image is captured, and determining 3D coordinate value of each of the first set of keypoints using the first set of 3D point cloud data.

A method for estimating a location may be provided, which may be performed by one or more processors and include receiving an image, detecting a first set of keypoints from the image, extracting a visual feature descriptor of each of the first set of keypoints, receiving a pre-stored second set of keypoints, in which each of the second set of keypoints includes, associated with the same, a visual feature descriptor and a 3D coordinate value, or includes, associated with the same, the visual feature descriptor, the 3D coordinate value, and image capturing direction information, performing feature matching by comparing the visual feature descriptors of the first set of keypoints with the visual feature descriptors of the second set of keypoints, and estimating fine location information of a location where the image is captured and fine image capturing direction information of the image, based on the 3D coordinate values associated with the keypoints, of the second set of keypoints, which succeeded the feature matching, or the 3D coordinate value and the image capturing direction information.

There is provided a non-transitory computer-readable recording medium storing instructions for executing the method for estimating a location described above on a computer.

A computing device system is provided, which may include a memory, and one or more processors connected to the memory and configured to execute one or more computer-readable programs included in the memory. The one or more programs may include instructions for receiving an image, detecting a first set of keypoints from the image, extracting a visual feature descriptor of each of the first set of keypoints, receiving a pre-stored second set of keypoints, in which each of the second set of keypoints includes, associated with the same, a visual feature descriptor and a 3D coordinate value, or includes, associated with the same, the visual feature descriptor, the 3D coordinate value, and image capturing direction information, performing feature matching by comparing the visual feature descriptors of the first set of keypoints with the visual feature descriptors of the second set of keypoints, and estimating fine location information of a location where the image is captured and fine image capturing direction information of the image, based on the 3D coordinate values associated with the keypoints, of the second set of keypoints, which succeeded the feature matching, or the 3D coordinate value and the image capturing direction information.

According to various examples of the present disclosure, it is possible to remove information that is not used in and even interferes with the subsequent process of estimating the vehicle location, and generate a visual feature map.

In various examples of the present disclosure, by removing most of the information unnecessary for location estimation, and by generating a visual feature map with the minimal visual information (visual feature descriptor) and geometric information (3D coordinate values) necessary for location recognition, it is possible to express a map of a large space with a very small capacity.

In various examples of the present disclosure, since the visual feature map includes relatively low-capacity data compared to the geometric information map, a map of a large space in a city unit may be stored in an autonomous vehicle or the like without requiring separate communication. In addition, the present invention can contribute to the development of a relatively inexpensive autonomous driving platform because it is possible to estimate the exact location and posture of the vehicle with only the images captured by the vehicle using the visual feature map stored in the vehicle in advance.

In various examples of the present disclosure, since the visual feature descriptor extracted from the image varies according to the image capturing direction, by associating the visual feature descriptor with the image capturing direction information and storing the same in a local map, it is possible to perform the location and posture estimation using only the keypoints that match the posture (or image capturing direction) of the vehicle in the subsequent process of estimating the vehicle location, thereby greatly increasing processing speed and accuracy.

According to various examples of the present disclosure, the vehicle can quickly estimate the current location and posture of the vehicle with high accuracy using a low-cost image sensor, a low-cost GPS module, and the like without an expensive high-precision GPS module.

BRIEF DESCRIPTION OF THE DRAWINGS

The above and other objects, features and advantages of the present disclosure will become more apparent to those of ordinary skill in the art by describing in detail exemplary examples thereof with reference to the accompanying drawings, in which.

DETAILED DESCRIPTION OF THE INVENTION

Figure 1:
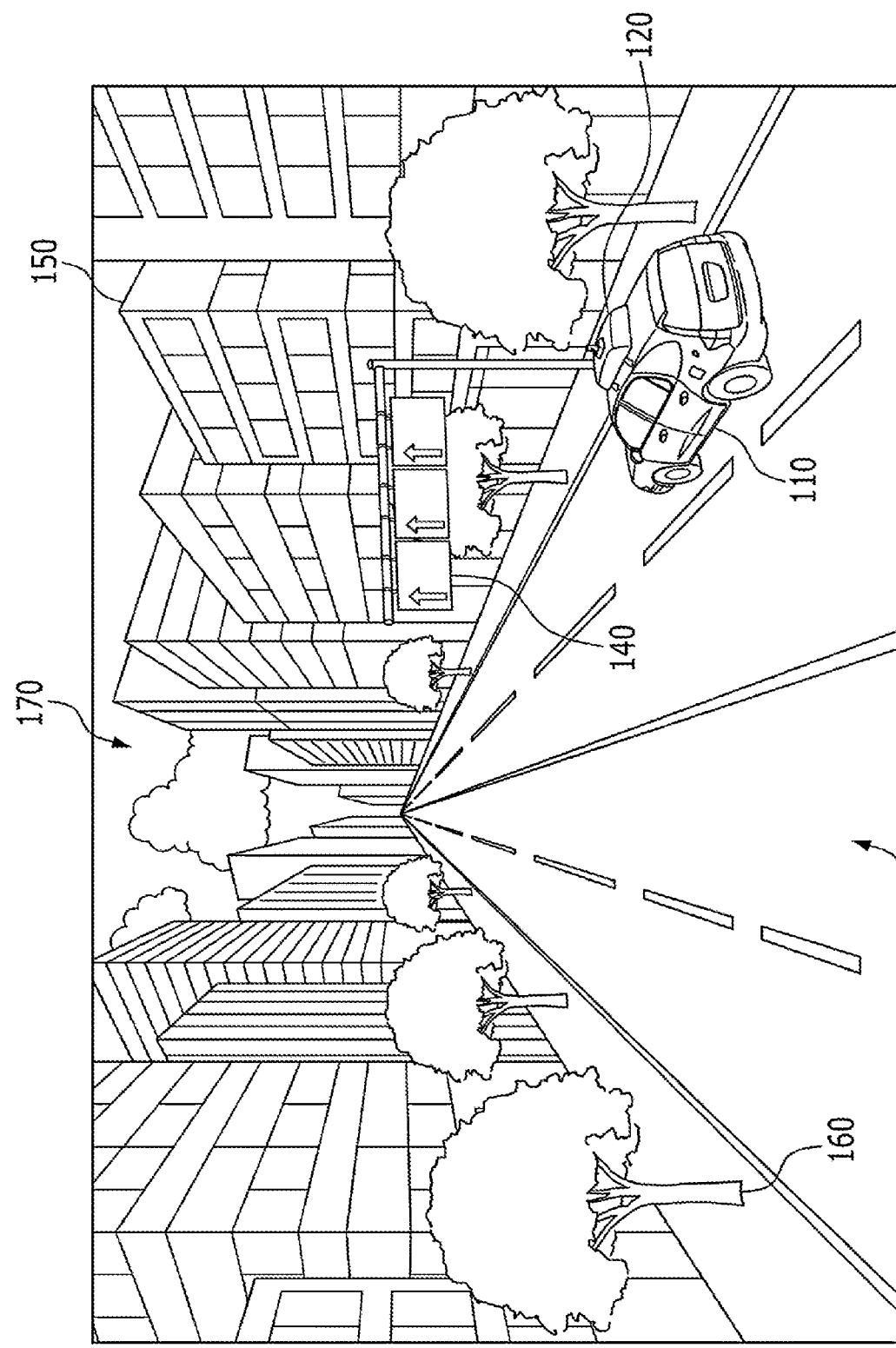
FIG. 1 is a diagram illustrating an example in which an MMS vehicle acquires 3D point cloud data using a LiDAR sensor.

Hereinafter, examples for the practice of the present disclosure will be described in detail with reference to the accompanying drawings. However, in the following description, detailed descriptions of well-known functions or configurations will be omitted when it may make the subject matter of the present disclosure unclear.

In the accompanying drawings, the same or corresponding components are assigned the same reference numerals. In addition, in the following description of the various examples, duplicate descriptions of the same or corresponding components may be omitted. However, even if descriptions of components are omitted, it is not intended that such components not be included in any embodiment.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the invention to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure. In addition, in specific cases, certain terms may be arbitrarily selected by the applicant, and the meaning of the terms will be described in detail in a corresponding description of the embodiment(s). Therefore, the terms used in the present disclosure should be defined based on the overall content of the present disclosure.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to execute one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, "3D point cloud data" may be 3D data acquired from the surface of an object using a LiDAR sensor or the like. Each point in the 3D point cloud data may have an associated 3D coordinate value. For example, the 3D coordinate value may be expressed in a UTM coordinate system.

In the present disclosure, a "distinctiveness score" may be a score indicating a degree by which a visual feature descriptor of a keypoint is differentiated from the other keypoints. The distinctiveness score of the keypoint may be calculated using a previously generated deep learning model. For example, an object with a higher frequency of appearance during road driving, such as a road surface, sky, or the like, may be given a lower distinctiveness score, and an object with a lower frequency of occurrence during road driving, such as a road sign or road layout, may be given a higher distinctiveness score.

In the present disclosure, a "local map" may refer to a visual feature map generated based on the keypoints, of the keypoints extracted from images captured by an MMS vehicle, which succeeded the feature matching. The local map may be updated based on the keypoints extracted from images continuously captured by an MMS vehicle.

In the present disclosure, a "global map" may refer to a visual feature map generated based on the keypoints, of the keypoints included in the local map, which succeeded the feature matching more than a predetermined number of times. The global map may be generated based on the keypoints, of the keypoints included in the local map, which succeeded the feature matching by at least a predetermined ratio.

FIG. 1 is a diagram illustrating an example in which a mobile mapping system (MMS) vehicle 110 acquires 3D point cloud data using a light detection and ranging (LiDAR) sensor 120. The MMS vehicle 110 may acquire geometric information (e.g., 3D point cloud data) around the vehicle (e.g., front, rear, side, and the like) using the LiDAR sensor 120, while driving in an area requiring map generation. In this case, the MMS vehicle 110 additionally uses expensive equipment such as a high-precision GPS module (not illustrated), an inertial measurement unit (IMU) sensor (not illustrated), or the like to receive fine location information of the MMS vehicle 110, and assign a 3D coordinate value to each point in the 3D point cloud data. For example, the 3D coordinate values of the points in the 3D point cloud data may be expressed in a Universal Transverse Mercator (UTM) coordinate system.

The LiDAR sensor 120 may include various types of LiDAR sensors. For example, the MMS vehicle 110 may acquire geometric information of a road surface 130 using a 2D LiDAR sensor(s), and acquire geometric information of a non-road area (that is, an area other than the road) such as a road sign 140, a building 150, a tree 160, and the like using a 3D LiDAR sensor(s). To this end, the MMS vehicle 110 may use pre-stored road information to classify the surrounding road area and the non-road area. For example, the road information may be information extracted from an aerial photograph.

Additionally, the MMS vehicle 110 may continuously capture images using an image sensor (not illustrated) while driving in an area requiring map generation. The MMS vehicle 110 may detect keypoints from each captured image and extract a visual feature descriptor of each detected keypoint. For example, the keypoint may be detected based on low-level information such as brightness information of pixels included in the captured image, a gradient of the brightness information, edge information, corner information, blob information, color information, and the like. In this case, the visual feature descriptor of the keypoint may be extracted based on the low-level image information in the area around the keypoint. The location of the keypoint may be represented by 3D coordinates, and the visual feature descriptor may be represented by a 3D or higher vector. For example, the visual feature descriptor may be expressed as a 64-dimensional or 128-dimensional vector.

The MMS vehicle 110 may be configured to, using a deep learning model, use only the keypoints having a distinctiveness score equal to or greater than a preset threshold. In this case, the distinctiveness score is a value predicted by the deep learning model from the input image with respect to a score for the degree by which the visual feature descriptor of the corresponding keypoint is differentiated from the other keypoints. For example, an object with a higher frequency of appearance during road driving, such as a road surface 130, a building 150, the sky 170, or the like, may be given a lower distinctiveness score, and an object with a lower frequency of occurrence during road driving, such as a road sign 140 or road layout, or the like, may be given a higher distinctiveness score. With this configuration, it is possible to know whether a keypoint is useful or not without performing feature matching with other keypoints, and information that is not used in and interferes with a process of estimating a vehicle location (e.g., localization) in the subsequent process may be removed.

After detecting the keypoints from the captured image, the MMS vehicle 110 may determine the 3D coordinate values of the extracted keypoints based on the 3D point cloud data acquired using the LiDAR sensor 120 or the like. The MMS vehicle 110 may be configured to use only the keypoints located within a preset distance (e.g., within 150 m) from the MMS vehicle 110. At a longer distance from the MMS vehicle 110, the error of the 3D coordinate value may be larger, the resolution of the video may be lower, and the extracted visual feature descriptor may describe a too wide area, resulting in reduced accuracy. Accordingly, the MMS vehicle 110 may calculate a distance between the image sensor and the extracted keypoint, and exclude the keypoint of a long distance.

The MMS vehicle 110 may recognize the posture of the vehicle at the time of capturing the image. For example, the expensive equipment, such as the high-precision GPS module (not illustrated), the IMU sensor (not illustrated), and the like may be used to recognize the posture of the MMS vehicle 110, and the recognized posture information may be used as the corresponding image capturing direction information. In this case, the posture information (or image capturing direction information) of the MMS vehicle 110 may be expressed as roll, pitch, and yaw values. Since the visual feature descriptor extracted from the image varies according to time at which the image is captured, the speed and accuracy of processing may be greatly improved by storing the image capturing direction information together with the visual feature descriptor, and performing the location estimation using only the keypoints that match the posture (or image capturing direction) of the vehicle in the subsequent process of estimating the vehicle location.

The extracted keypoints for each image may be stored together with the associated visual feature descriptors, 3D coordinate values, and image capturing direction information, respectively. A visual feature map may be generated based on the keypoints (including the visual feature descriptor, the 3D coordinate value, and the image capturing direction information) extracted from the images captured by the MMS vehicle 110 while driving. Details of the method for generating the visual feature map will be described below.

Although it has been described above that the MMS vehicle 110 generates the visual feature map, aspects of the present invention are not limited thereto. For example, the MMS vehicle 110 transmits a captured image, acquired 3D point cloud data, location information received from GPS, image capturing direction information, and the like to an external device (e.g., a server), and the external device may generate a visual feature map based on the received data. In addition, although one MMS vehicle 110 is illustrated in FIG. 1, an external device may receive data from a plurality of MMS vehicles 110 to generate a visual feature map.

Figure 2:
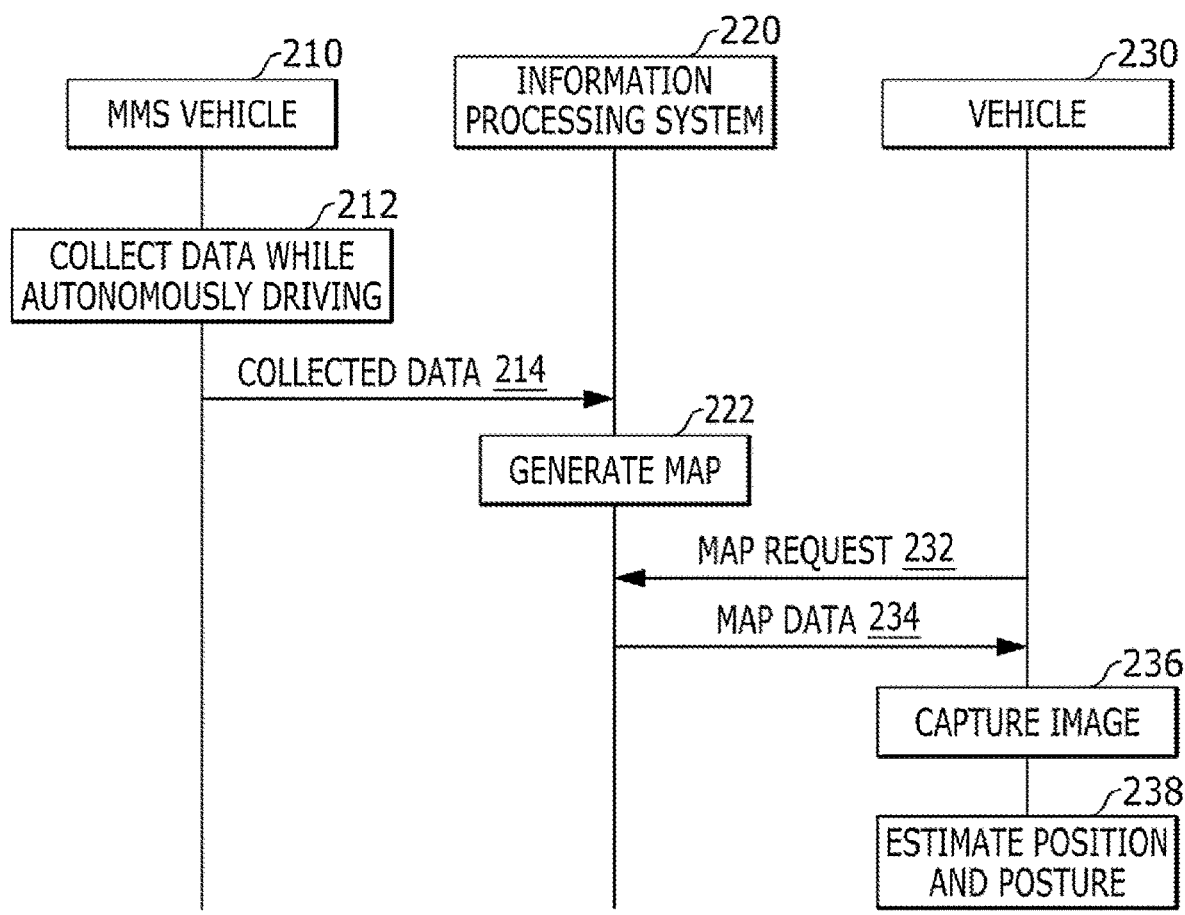
FIG. 2 is a flowchart illustrating a method performed among an MMS vehicle, an information processing system, and a vehicle, for generating a map and estimating a location and posture.

FIG. 2 is a flowchart illustrating a method performed among an MMS vehicle 210, an information processing system 220, and a vehicle 230, for generating a map and estimating a location and posture. As illustrated, the MMS vehicle 210 may collect data while driving (e.g., autonomously driving) in an area requiring map generation, at 212. The collected data 214 may include 3D point cloud data, captured image, location and posture information of the MMS vehicle 210 over time and the like, which are acquired by the MMS vehicle 210 driving on a road. In another example, the collected data 214 may include keypoints detected from the captured image. In this case, each keypoint may have an associated visual feature descriptor, 3D coordinate value, and image capturing direction information. The MMS vehicle 210 may transmit the collected data 214 to the information processing system 220 in real time or periodically.

The information processing system 220 may generate a visual feature map 222 based on the data 214 received from the MMS vehicle 210. If the 3D point cloud data, the captured image, and the location information are received from the MMS vehicle 210, the information processing system 220 may detect the keypoints from the received image, and extract the associated visual feature descriptor, 3D coordinate value, and image capturing direction information to generate a visual feature map, at 222. Alternatively, if a set of keypoints including the visual feature descriptor, the 3D point cloud data, and the image capturing direction information are received from the MMS vehicle 210, the information processing system 220 may generate a visual feature map based on the received data 214, at 222.

The vehicle 230 driving on the road may transmit a map request 232 to the information processing system 220 to estimate the current location and posture. The vehicle 230 may be a general passenger car that is not equipped with an expensive, high-precision GPS module mounted on the MMS vehicle 210. For example, the vehicle 230 may be any vehicle 230 equipped with an image sensor for capturing images, and may optionally include a low-cost GPS module.

In response to receiving the map request 232, the information processing system 220 may transmit the map data 234 to the vehicle 230. The information processing system 220 may transmit the entire stored map data 234 to the vehicle 230. In another example, the map request 232 may include location information, and the information processing system 220 may transmit a part of the entire map data 234 to the vehicle 230 based on the location information included in the map request 232. For example, the information processing system 220 may transmit the map data 234 within a 150 m radius from the current location of the vehicle 230 (coarse location) to the vehicle 230.

While driving on a road, the vehicle 230 may capture surrounding images in front, back, and the like using an image sensor, at 236. The vehicle 230 may detect the keypoints from the captured image using the same method used for generating the visual feature map, and extract a visual feature descriptor of each detected keypoint. By comparing the extracted visual feature descriptors with the visual feature descriptors of the keypoints included in the received map data 234, the vehicle 230 may estimate a fine location and posture, at 238. For example, the vehicle 230 may identify visual feature descriptors in the map data 234 that are similar to the visual feature descriptors extracted from the captured image, and estimate the precise location and posture of the vehicle 230 based on the 3D coordinate value associated with the identified visual feature descriptors and the image capturing direction information, at 238.

FIG. 2 illustrates that the vehicle 230 receives the map data 234 from the information processing system 220 and performs the location and posture estimation, but aspects of the present invention are not limited thereto. For example, an image captured by the vehicle 230 may be transmitted to the information processing system 220, and the location and posture of the vehicle 230 may be estimated based on the image received by the information processing system 220. In this case, the information processing system 220 may transmit the estimated location and posture information to the vehicle 230. Alternatively, rather than transmitting the map request 232 to the information processing system 220, the vehicle 230 may estimate the current location and posture using a map pre-stored in the vehicle 230, at 238. With the configuration described above, the vehicle 230 can quickly estimate the current location and posture of the vehicle 230 with high accuracy using a low-cost image sensor, low-cost GPS module, or the like without an expensive high-precision GPS module.

Figure 3:
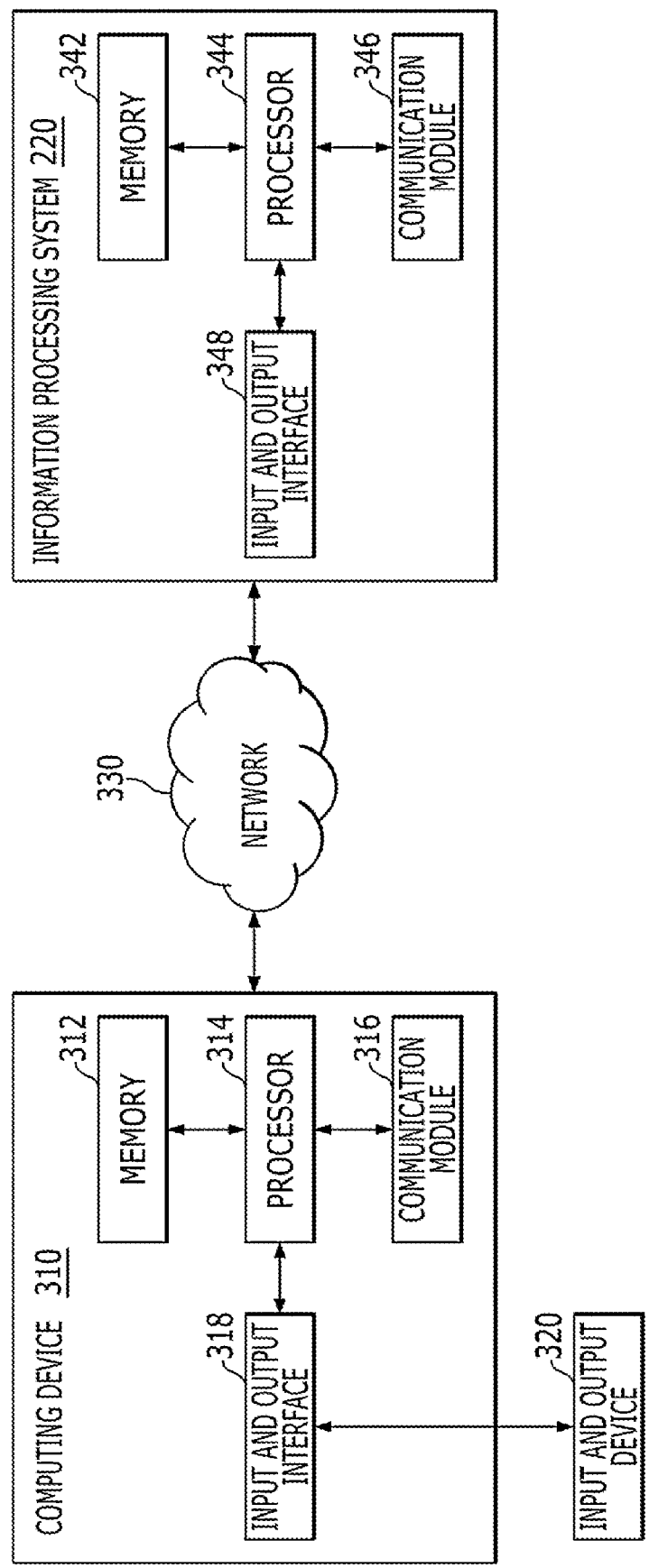
FIG. 3 is a block diagram illustrating an internal configuration of a computing device and the information processing system.

FIG. 3 is a block diagram illustrating an internal configuration of a computing device 310 and the information processing system 220. The computing device 310 may refer to any device capable of image processing and capable of wired/wireless communication, and may include the MMS vehicle 210, the vehicle 230, and the like shown in FIG. 2, for example. As illustrated, the computing device 310 may include a memory 312, a processor 314, a communication module 316, and an input and output interface 318. Likewise, the information processing system 220 may include a memory 342, a processor 344, a communication module 346, and an input and output interface 348. As illustrated in FIG. 3, the computing device 310 and the information processing system 220 may be configured to communicate information and/or data through a network 330 using the respective communication modules 316 and 346. In addition, the input and output device 320 may be configured to input information and/or data to the computing device 310 or to output information and/or data generated from the computing device 310 through the input and output interface 318.

The memories 312 and 342 may include any non-transitory computer-readable recording medium. The memories 312 and 342 may include a permanent mass storage device such as random access memory (RAM), read only memory (ROM), disk drive, solid state drive (SSD), flash memory, and so on. As another example, the permanent mass storage device such as ROM, SSD, flash memory, disk drive, and the like is a separate permanent storage device that is distinguished from the memories 312 and 342 and may be included in the computing device 310 or the information processing system 220. In addition, an operating system and at least one program code may be stored in the memories 312 and 342.

Software components may be loaded from a computer-readable recording medium separate from the memories 312 and 342. Such a separate computer-readable recording medium may include a recording medium directly connectable to the computing device 310 and the information processing system 220, and may include a computer-readable recording medium such as a floppy drive, a disk, a tape, a DVD/CD-ROM drive, a memory card, and the like, for example. As another example, the software components may be loaded into the memories 312 and 342 through the communication modules 316 and 346 rather than the computer-readable recording medium. For example, at least one program may be loaded into the memories 312 and 342 based on a computer program installed by files provided by developers or a file distribution system that distributes an installation file of an application through the network 330.

The processors 314 and 344 may be configured to process the instructions of the computer program by performing basic arithmetic, logic, and input and output operations. The instructions may be provided to the processors 314 and 344 from the memories 312 and 342 or the communication modules 316 and 346. For example, the processors 314 and 344 may be configured to execute the received instructions according to a program code stored in a recording device such as the memories 312 and 342.

The communication modules 316 and 346 may provide a configuration or function for the computing device 310 and the information processing system 220 to communicate with each other through the network 330, and may provide a configuration or function for the computing device 310 and/or the information processing system 220 to communicate with another computing device 310 or another system (e.g., a separate cloud system or the like). For example, the requests or data generated by the processor 314 of the computing device 310 according to the program code stored in the recording device such as the memory 312 or the like may be transmitted to the information processing system 220 through the network 330 under the control of the communication module 316. Conversely, a control signal or instructions provided under the control of the processor 344 of the information processing system 220 may be received by the computing device 310 through the communication module 316 of the computing device 310 via the communication module 346 and the network 330.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, while the processor 314 of the computing device 310 processes the instructions of the computer program loaded in the memory 312, a service screen or the like, which is configured with the information and/or data provided by the information processing system 220 or other computing devices may be displayed on the display through the input and output interface 318. While FIG. 3 illustrates that the input and output device 320 is not included in the computing device 310, aspects of the present invention are not limited thereto, and it may be configured as one device with the computing device 310. In addition, the input and output interface 348 of the information processing system 220 may be a means for interfacing with a device (not illustrated) for inputting or outputting, which may be connected to the information processing system 220 or included in the information processing system 220. While FIG. 3 illustrates the input and output interfaces 318 and 348 as the components configured separately from the processors 314 and 344, aspects of the present invention are not limited thereto, and the input and output interfaces 318 and 348 may be configured to be included in the processors 314 and 344.

The computing device 310 and the information processing system 220 may include more components than the components illustrated in FIG. 3. Meanwhile, most of the related components may not necessarily require exact illustration. The computing device 310 may be implemented such that it includes at least some of the input and output devices 320 described above. In addition, the computing device 310 may further include other components such as a global positioning system (GPS) module, 2D and 3D LiDAR sensors, a wheel encoder, an inertial measurement unit (IMU), a transceiver, various sensors, a database, and the like.

The processor 314 of the computing device 310 may be configured to detect keypoints from an image and extract visual feature descriptors of the detected keypoints. In this case, an associated program code may be loaded into the memory 312 of the computing device 310. While the program code is running, the processor 314 of the computing device 310 may receive information and/or data provided from the input and output device 320 through the input and output interface 318 or receive information and/or data from the information processing system 220 through the communication module 316, and may process the received information and/or data and store it in the memory 312. In addition, such information and/or data may be provided to the information processing system 220 through the communication module 316.

The processor 314 may receive images, videos, input or selected text, and the like through input devices such as an image sensor, a LiDAR sensor, a GPS module, an IMU sensor, a touch screen, a keyboard, an audio sensor, and the like connected to the input and output interface 318, and may store, in the memory 312, the received image, the 3D point cloud data, the location information, the vehicle posture information (or the image capturing direction information), the text, and the like, or provide them to the information processing system 220 through the communication module 316 and the network 330. The processor 314 may provide the captured image, the 3D point cloud data, the location information, and the vehicle posture information (or the image capturing direction information) received through the input device to the information processing system 220 through the network 330 and the communication module 316.

Alternatively, the processor 314 may detect keypoints from the captured image, extract visual feature descriptors associated with the detected keypoints, 3D coordinate values, image capturing direction information, and the like, and provide the extracted information to the information processing system 220.

The processor 344 of the information processing system 220 may be configured to manage, process, and/or store the information and/or the data received from a plurality of computing devices and/or a plurality of external systems. The processor 344 may generate a map database (e.g., a visual feature map) based on the data received from the computing device 310. Additionally or alternatively, the processor 344 may transmit the map database or the like to the computing device 310.

Figure 4:
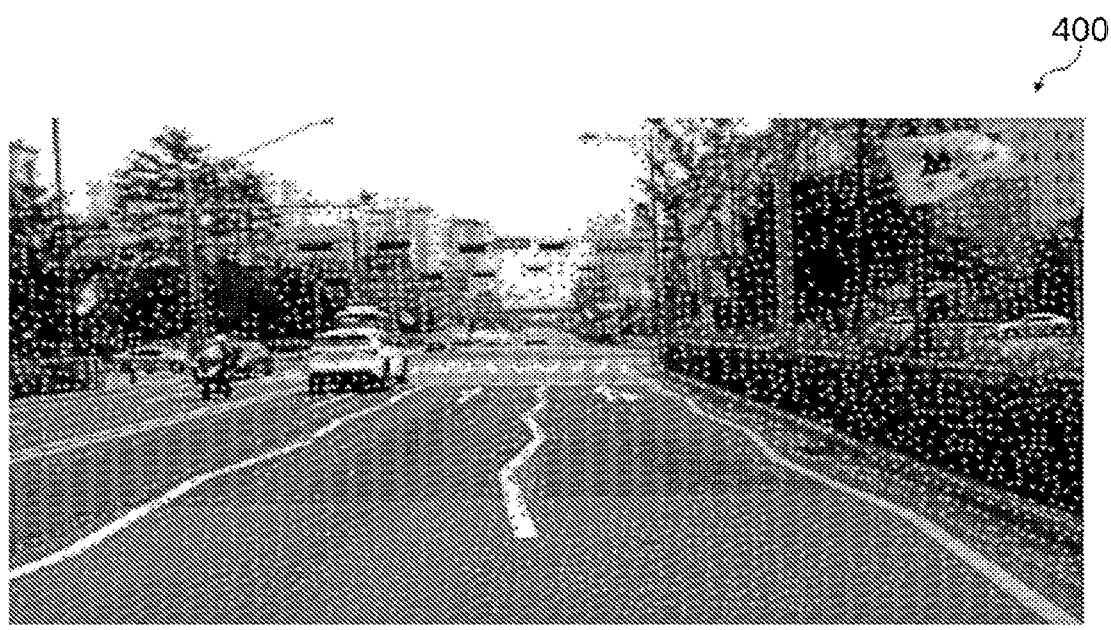
FIG. 4 is a diagram illustrating an example of detecting keypoints in an image.

FIG. 4 is a diagram illustrating an example of detecting keypoints in an image 400. The image 400 may be captured in a forward direction by the MMS vehicle 210 or the vehicle 230 in FIG. 2 while driving on a road. The processor 314 of the MMS vehicle 210 or the vehicle 230 may detect the keypoints from the image 400. As illustrated, the keypoints may be displayed as dots on the image 400. After detecting the keypoints, the processor 314 may extract a visual feature descriptor of each keypoint. For example, the visual feature descriptor may be a 128-dimensional vector representing visual information (e.g., low-level information) around the keypoint.

The processor 314 may detect only the keypoints having a distinctiveness score equal to or greater than a preset threshold. Additionally or alternatively, the processor 314 may detect only the keypoints located within a preset distance from the location where the image 400 was captured. The MMS vehicle 210 that collects data for generating a map and the vehicle 230 that requires location and posture estimation may be configured to detect keypoints and extract visual feature descriptors of the keypoints in the same or similar manner to each other. For example, the MMS vehicle 210 may detect the keypoints that have a distinctiveness score equal to or greater than a preset threshold and that are located within a preset distance from the MMS vehicle 210. Meanwhile, since the vehicle 230 that requires location and posture estimation is not equipped with an expensive sensor such as a LiDAR sensor and the like, it may detect keypoints having a distinctiveness score equal to or greater than a preset threshold. If the keypoints are detected in the manner described above, only the useful keypoints that are distinguished from the other keypoints may be used for the generation of a map and/or estimation of vehicle location and posture.

Figure 5:
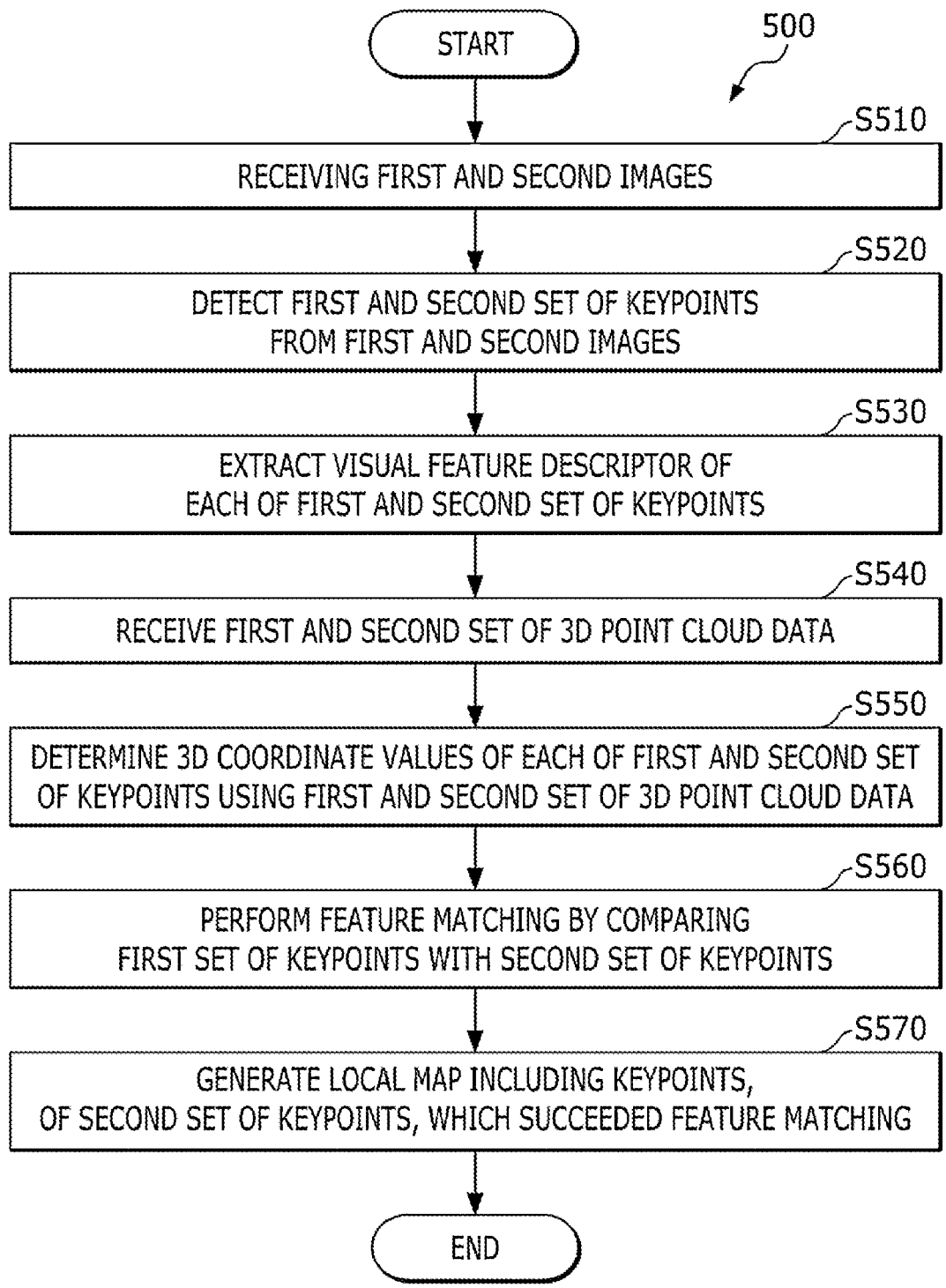
FIG. 5 is a flowchart illustrating an example of a method for generating a local map.

FIG. 5 is a flowchart illustrating an example of a method 500 for generating a local map. The method 500 for generating the local map may be performed by the MMS vehicle 210 (e.g., the processor 314 of the MMS vehicle 210). In another example, the method 500 for generating the local map may be performed by the information processing system 220 (e.g., the processor 344 of the information processing system 220). In still another example, the information processing system 220 and the MMS vehicle 210 may divide and perform the steps of the method 500 for generating the local map.

As illustrated, the method 500 for generating the local map may be initiated by the processor 314 receiving a first image and a second image, at S510. For example, the processor 314 may receive the image from the image sensor. Alternatively, the processor 314 may receive the image from an external device through the communication module 316. The first image and the second image may be images captured sequentially by the MMS vehicle 210 while driving. The processor 314 may also receive the image capturing direction information of each image. For example, the image capturing direction information of the image may be posture information of the MMS vehicle 210, and expressed as roll, pitch, and yaw values.

In response to receiving the image, the processor 314 may detect a first set of keypoints and a second set of keypoints from the first image and the second image, respectively, at S520. In detecting the first set of keypoints, the processor 314 may detect a plurality of keypoints from the first image, and identify keypoints of the detected plurality of keypoints, which are located within a preset distance. Additionally or alternatively, the processor 314 may detect a plurality of keypoints from the first image, calculate a distinctiveness score of each of the detected plurality of keypoints, and identify, among the plurality of keypoints, the keypoints having a distinctiveness score equal to or greater than a preset threshold. The identified keypoints are then determined to be the first set of keypoints. The second set of keypoints may be detected in the same manner as the first set of keypoints. After detecting the keypoints from the first and second images, the processor 314 may extract a visual feature descriptor of each of the first set of keypoints and a visual feature descriptor of each of the second set of keypoints, at S530.

In addition, the processor 314 may receive a first set of 3D point cloud data associated with the location where the first image is captured, and receive a second set of 3D point cloud data associated with the location where the second image is captured, at S540. For example, the first and second sets of 3D point cloud data may include 3D coordinate values of a surface of an object around the location where the first image and the second image are captured, respectively. The processor 314 may use a 2D LiDAR sensor to acquire geometric information of a road surface around a location where each image is captured, and may use a 3D LiDAR sensor to acquire geometric information of a non-road area around the locations where each image is captured.

Using the first and second sets of 3D point cloud data, the processor 314 may determine the 3D coordinate values of each of the first and second sets of keypoints, at S550. For example, the processor 314 may project, onto the first image from which the first set of keypoints are detected, the first set of 3D point cloud data associated with the first image, and determine the 3D coordinate value of each of the first set of keypoints. For example, the processor 314 may determine the coordinate value of each keypoint based on the coordinate value of the point cloud data projected on each keypoint. For example, if a first point of the point cloud data is projected onto the first keypoint, the processor 314 may determine the coordinate value of the first keypoint as the coordinate value of the first point. The processor 314 may determine the 3D coordinate value of each of the second set of keypoints in the same manner as the first set of keypoints. Projecting 3D point cloud data onto an image may refer to transforming the 3D point cloud data to representations on a 2D image plane. Projection of 3D point cloud data onto an image may be performed by using mathematical camera transform models, such as, pinhole camera perspective projection, spherical projection, etc.

The processor 314 may perform feature matching by comparing the visual feature descriptors of the first set of keypoints with the visual feature descriptors of the second set of keypoints, at S560. In this case, for successful feature matching, it requires that the visual feature descriptors of two keypoints have the highest similarity, and that this similarity is higher than the similarities to other keypoints by a predetermined difference or more. For example, if the visual feature descriptors of keypoints A and B have the highest similarity of 0.9, and the visual feature descriptors of keypoints A and C have the second highest similarity of 0.4, the processor 314 may determine that the feature matching of the keypoints A and B has succeeded, because the similarity between the keypoints A and B is the highest and is higher than the similarity to other keypoints by a predetermined difference (e.g., 0.4) or more. On the other hand, if the visual feature descriptors of the keypoints A and B have the highest similarity of 0.9, and the visual feature descriptors of the keypoints A and C have the second highest similarity of 0.7, the processor 314 may determine that the feature matching of the keypoints A and B has failed, because while the similarity between the keypoints A and B is the highest, it is not higher than the similarity to the other keypoints by the predetermined difference (e.g., 0.4) or more.

After the feature matching, the processor 314 may generate a local map (e.g., an initial local map) including the keypoints, of the second set of keypoints, which succeeded the feature matching, at S570. Specifically, the processor 314 may receive the image capturing direction information of the second image, associate the visual feature descriptor, the 3D coordinate value, and the image capturing direction information with respect to each of the keypoints, of the second set of keypoints, which succeeded the feature matching, and store the associated information in the local map. Since the visual feature descriptor extracted from the image varies according to the image capturing direction, by associating the visual feature descriptor with the image capturing direction information and storing the result in the local map, it is possible to increase the accuracy of estimating the vehicle location and posture in the subsequent process.

FIG. 5 illustrates that, after receiving the first and second images, the processor 314 detects the keypoints of each image, extracts the visual feature descriptors of the keypoints, and determines the 3D coordinate value of each keypoint, but aspects of the present invention are not limited thereto. For example, after receiving the first image, detecting the keypoints from the first image, extracting the visual feature descriptors of the keypoints, and determining the 3D coordinate value of each keypoint, the processor 314 may receive the second image, detect the keypoints from the second image, extract the visual feature descriptors of the keypoints, and determine the 3D coordinate value of each keypoint.

Figure 6:
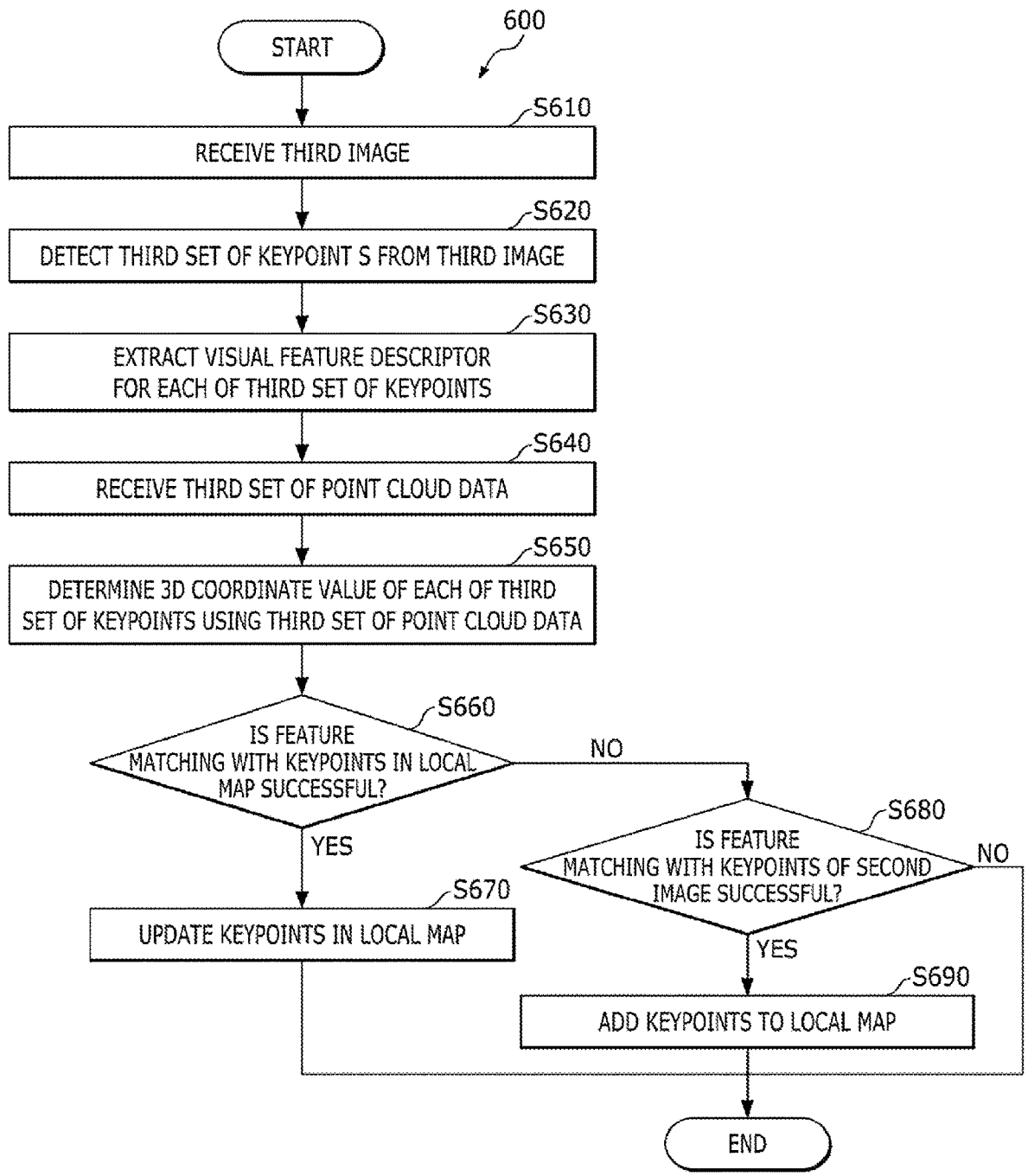
FIG. 6 is a flowchart illustrating a method for updating a local map.

FIG. 6 is a flowchart illustrating a method 600 for updating the local map. As illustrated, the method 600 for updating the local map may be initiated by the processor 314 receiving a third image, at S610. The third image may be a subsequent image of the first image and the second image. The processor 314 may also receive the image capturing direction information of the third image.

The processor 314 may detect a third set of keypoints from the third image, at S620. In addition, the processor 314 may extract a visual feature descriptor of each of the third set of keypoints, at S630. In this case, the processor 314 may detect a third set of keypoints from the third image, and extract a visual feature descriptor of each of the third set of keypoints in the same way as detecting the keypoints from the first and second images and extracting the visual feature descriptors.

In addition, the processor may receive a third set of 3D point cloud data associated with the location where the third image is captured, at S640. For example, the third set of 3D point cloud data may include 3D coordinate values of the surface of an object around the location where the third image is captured. Using the third set of point cloud data, the processor 314 may determine the 3D coordinate value of each of the third set of keypoints, at S650. For example, the processor 314 may project, onto the third image from which the third set of keypoints are detected, the third set of 3D point cloud data associated with the third image, and determine the 3D coordinate value of each of the third set of keypoints.

The processor 314 may perform feature matching by comparing the visual feature descriptors of the third set of keypoints with the visual feature descriptors of the keypoints in the previously generated local map (e.g., the initial local map of FIG. 5). Based on the result of performing the feature matching, the processor 314 may determine whether or not each of the third set of keypoints succeeded the feature matching with the keypoints in the local map, at S660. The processor 314 may update the keypoints in the local map based on the keypoints, of the third set of keypoints, which succeeded the feature matching, at S670. In this case, updating the keypoint in the local map may include updating information associated with the keypoint stored in the local map. For example, the processor 314 may update the local map by calculating the average value of the visual feature descriptors of a pair of keypoints that succeeded the feature matching. Additionally, the processor 314 may update the local map by calculating the average value of the image capturing direction information of a pair of keypoints that succeeded in feature matching. Alternatively, the processor 314 may associate the image capturing direction information of a pair of keypoints that succeeded the feature matching and store them together in the local map.

Additionally, the processor 314 may perform feature matching by comparing the visual feature descriptors of the keypoints, of the third set of keypoints, which failed the feature matching with the keypoints in the local map, and the visual feature descriptors of the immediately preceding image (e.g., the visual feature descriptors of the each of the second set of keypoints of the second image), and determine whether or not the feature matching succeeded, at S680. The processor 314 may add, to the local map, the keypoints that succeeded the in feature matching based on the result of performing the feature matching, at S690. Specifically, the visual feature descriptor, the 3D coordinate value, and the image capturing direction information may be associated with each of the keypoints that succeeded the feature matching, and stored in the local map. The keypoints newly added to the local map through feature matching may be used for feature matching with subsequent images.

Figure 7:
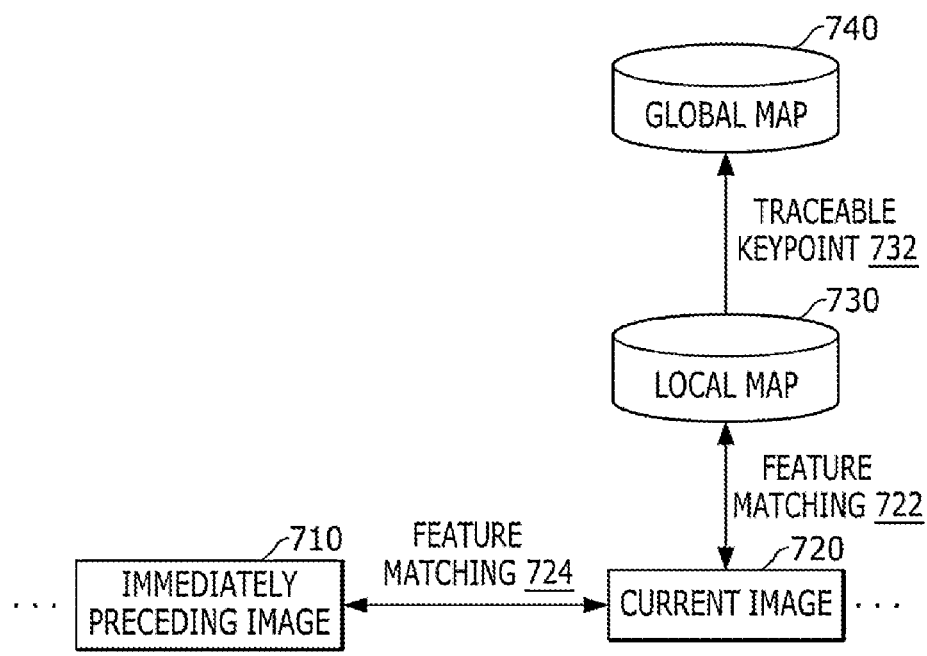
FIG. 7 is a diagram illustrating an example of generating a global map by performing feature matching.

FIG. 7 is a diagram illustrating an example of performing feature matching 722 and 724 to generate a global map 740. The processor 314 may sequentially receive and process images captured by the MMS vehicle 210 while driving in an area requiring map generation. Specifically, the processor 314 may update a local map 730 or add a new keypoint to the local map 730 based on the feature matching 722 between a currently received image 720 and the local map 730, and the feature matching 724 between the currently received image 720 and an immediately preceding image 710. In addition, the global map 740 may be generated using a keypoint 732, of the keypoints included in the local map 730, which is traceable.

The processor 314 may detect the keypoints from the current image 720, extract a visual feature descriptor of each keypoint, and determine a 3D coordinate value of each keypoint. In addition, the processor 314 may receive image capturing direction information of the current image 720. The processor 314 may perform the feature matching 722 by comparing the visual feature descriptors of the keypoints of the current image 720 with the visual feature descriptors of the keypoints included in the local map 730.

The processor 314 may update the local map 730 based on the keypoints, of the keypoints of the current image 720, which succeeded the feature matching 722. For example, if the keypoint A of the current image 720 and the keypoint B in the local map 730 succeeded the feature matching 722, the processor 314 may calculate an average value of the visual feature descriptors of the pair of keypoints (keypoints A and B) that succeeded the feature matching 722, and update the visual feature descriptor of keypoint B in the local map 730 to the calculated average value. Additionally, the processor 314 may calculate the average value of the image capturing direction information of the pair of keypoints (keypoints A and B) that succeeded the feature matching 722, and update the image capturing direction information of the keypoint B in the local map 730 to the calculated average value. Alternatively, the processor 314 may store the image capturing direction information of the keypoint A of the current image 720, which succeeded the feature matching 722, in association with the image capturing direction information of the keypoint B in the local map 730.

The processor 314 may perform the feature matching 724 between the keypoints, of the keypoints of the current image 720, which failed the feature matching 722, and keypoints of the immediately preceding image 710. For example, the processor 314 may compare the visual feature descriptors of the keypoints, of the keypoints of the current image 720, which failed the feature matching 722, with the visual feature descriptors of the keypoints of the immediately preceding image 710. In this case, the processor 314 may add the keypoints that succeeded the feature matching 724 to the local map 730. Specifically, each of one or more keypoints, of the keypoints of the current image 720, which succeeded the feature matching 724, may be stored in the local map 730 in association with each visual feature descriptor, 3D coordinate value, and image capturing direction information.

The processor 314 may repeatedly perform the processes described above with respect to continuously received images. Accordingly, the keypoints included in the local map 730 may be continuously updated, or a new keypoint may be added to the local map 730. In this process, the processor 314 may remove, from the local map 730, the keypoints, of the keypoints included in the local map 730, which failed the feature matching a predetermined number of times (e.g., 10 times) or more. For example, a keypoint in the local map 730 that failed the feature matching with 10 incoming images may be removed.

On the other hand, the processor 314 may generate the global map 740 based on a keypoint, of the keypoints included in the local map 730, which succeeded the feature matching a predetermined number of times (e.g., 10 times) or more. For example, a keypoint in the local map 730 that succeeded the feature matching with 10 incoming images may be added to the global map 740 as the traceable keypoint 732. The number of successes or failures in feature matching may be counted continuously or discontinuously. In another example, the processor 314 may remove or add the keypoints from or to the local map 730 based on a predetermined ratio (e.g., 50% or more of 20 images) rather than a predetermined number of times.

The global map 740 generated as a result may be used as a visual feature map. With the configuration described above, the local map 730 may include only the keypoints suitable for feature matching, and by adding only the traceable keypoints of the local map 730 to the global map 740, a visual feature map may be generated with a very small capacity of data or information. That is, by removing most of the information unnecessary for the location estimation, and by generating a visual feature map with minimal visual information (visual feature descriptor) and geometric information (3D coordinate values) necessary for the location estimation, it is possible to express a map of a large space with a very small capacity of data or information.

Figure 8:
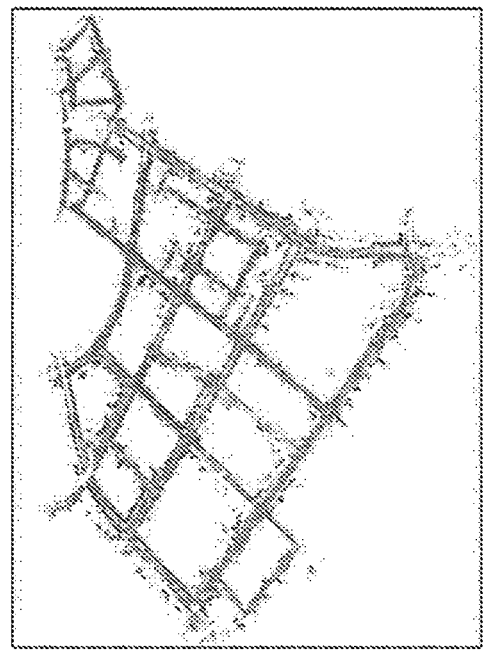
FIG. 8 shows an example of visually representing a generated 3D point cloud map and a generated visual feature map.
Figure 8:
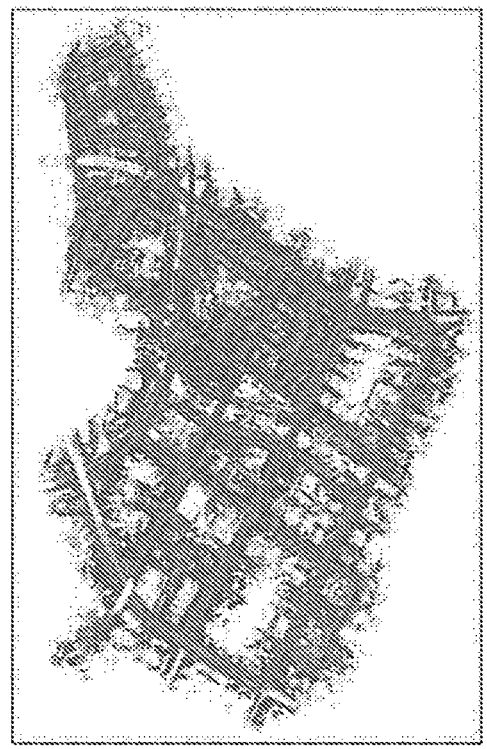

FIG. 8 shows an example of visually representing a generated 3D point cloud map 810 and a generated visual feature map 820. The processor 314 may acquire 3D point cloud data around the driving MMS vehicle 210 using a LiDAR sensor. In addition, the processor 314 may receive fine location information of the MMS vehicle 210 using expensive equipment such as a high-precision GPS module, an IMU sensor, or the like, and assign a 3D coordinate value to 3D point cloud data acquired using the LiDAR sensor. The 3D point cloud map 810 is an example of expressing the 3D coordinate values of points in 3D point cloud data of an area where the MMS vehicle 210 is driving in the UTM coordinate system. For example, the 3D point cloud map 810 may include all 3D point cloud data extracted from the road areas and the non-road areas around the MMS vehicle 210.

The visual feature map 820 is an example of a global map generated according to the method of FIGS. 5 to 7. That is, it is an example in which the MMS vehicle 210 driving on a road detects the keypoints from the sequentially-captured images, and the 3D coordinate values of the traceable keypoints of the detected keypoints are expressed in the UTM coordinate system. No matter how many 3D point cloud data and visual feature descriptors are included in the visual feature map 820, unless these are uniquely matched during feature matching, the accurate estimation of the location of the vehicle will not be possible. Accordingly, it is desirable to generate the visual feature map 820 using only the traceable keypoints that have distinctiveness and that are robust to a change in viewpoint. Each point in the visual feature map 820 may include, associated with the same, a visual feature descriptor, a 3D coordinate value, and image capturing direction information.

As illustrated, by generating the visual feature map 820 using some of the 3D point cloud data (traceable keypoints) included in the 3D point cloud map 810, a map representing a large-scale space may be generated with minimal information. Since the visual feature map 820 generated as described above has a relatively low amount of data compared to the geometric information map, a map of a large space in a city unit may be stored in an autonomous vehicle or the like without requiring separate communication. In addition, a relatively inexpensive autonomous driving platform may be provided, because the precise location and posture of the vehicle can be estimated based on the image captured by the vehicle using the visual feature map 820 stored in the vehicle in advance.

Figure 9:
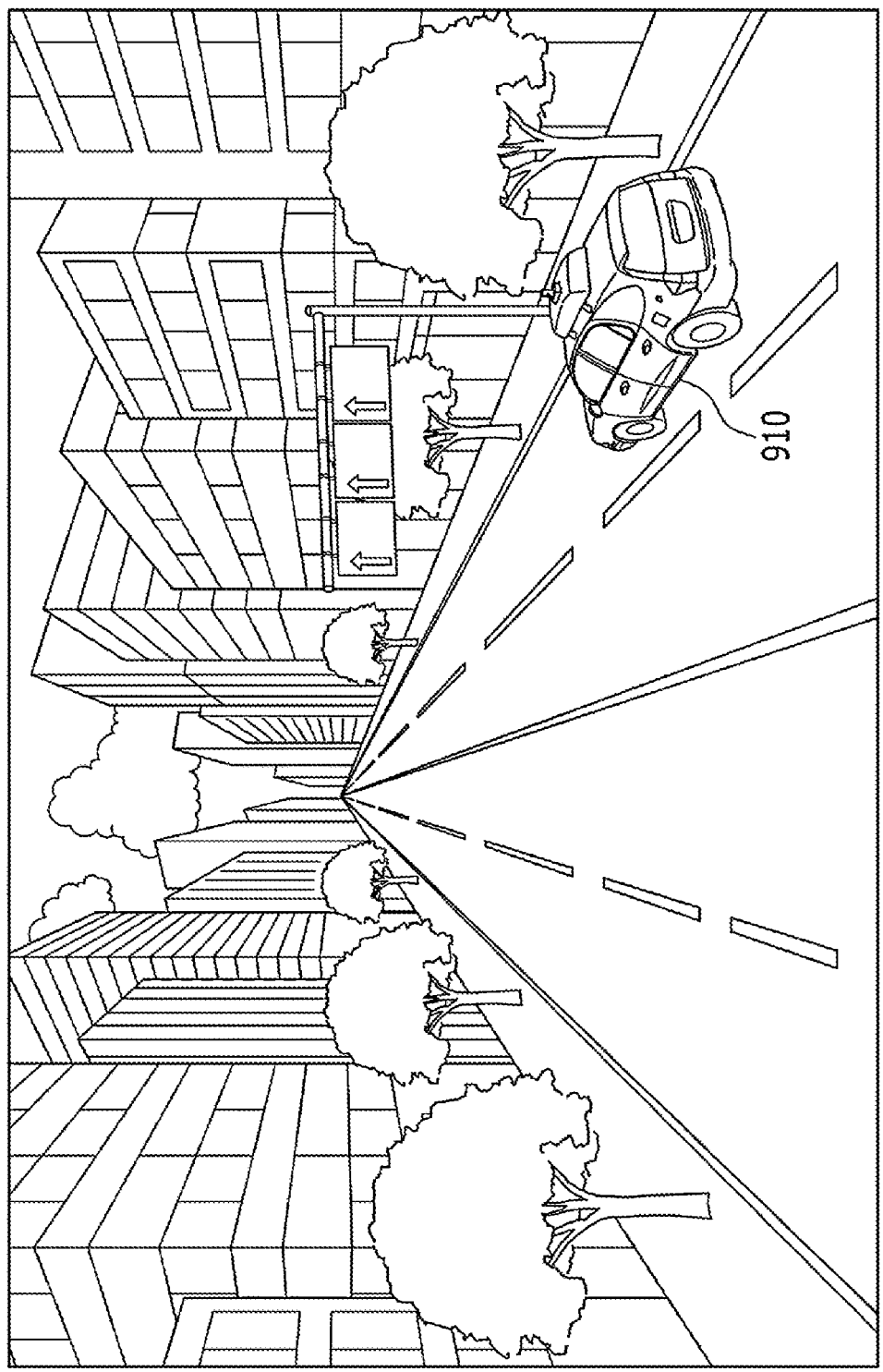
FIG. 9 is a diagram illustrating an example of estimating a location and posture of a vehicle.

FIG. 9 is a diagram illustrating an example of estimating the location and posture of a vehicle 910. The vehicle 910 may be a general passenger car that is not equipped with an expensive, high-precision GPS module mounted on the MMS vehicle (e.g., 210 of FIG. 2). For example, the vehicle

910 may be any vehicle 910 equipped with an image sensor for capturing images, and may optionally include a low-cost GPS module.

The vehicle 910 may receive a visual feature map from an external device (e.g., a map server). At this time, the vehicle 910 may receive a part of the visual feature map (e.g., map data around the vehicle 910) based on the coarse location information of the vehicle 910 received from the low-cost GPS module. For example, if the visual feature map is a set of map data representing a 20 m*20 m range, the vehicle 910 may receive the map data within a radius of approximately 150 m therefrom based on the coarse location information. Accordingly, since the search range of the visual feature descriptor required for estimating the location of the vehicle 910 can be easily reduced, and additional communication with the external device is not required after receiving the map data, communication with the external device can be minimized. Alternatively, the vehicle 910 may use a visual feature map pre-stored in the internal memory. In this case, the vehicle 910 may use a part of the pre-stored visual feature map for location and posture estimation based on the coarse location information of the vehicle 910 received from the low-cost GPS module.

In order to estimate the location and posture of the vehicle 910, the vehicle 910 may capture an image while driving on a road. The vehicle 910 may detect the keypoints from the captured image and extract visual feature descriptors of the detected keypoints. In this case, the vehicle 910 may detect the keypoint and extract the visual feature descriptor using the same method used to generate the visual feature map.

The vehicle 910 may compare the visual feature descriptors of the keypoints included in the visual feature map with the visual feature descriptors of the keypoints detected from the image to estimate the current location and posture of the vehicle 910. The vehicle 910 may identify, among the visual feature descriptors included in the visual feature map and the visual feature descriptors extracted from the captured image, a pair of visual feature descriptors that are similar, and if a sufficient number of pairs are identified, may estimate the location and posture of the vehicle 910 using an efficient perspective-n-point (EPnP) algorithm or the like. In this case, the 3D coordinate value, the image capturing direction information, and the like in the visual feature map associated with a pair of similar visual feature descriptors may be used.

Additionally or alternatively, the vehicle 910 may perform location and posture estimation using only the keypoints, of the keypoints included in the visual feature map, which are detected from the image captured in a direction similar to the current image capturing direction of the vehicle 910. For example, the vehicle 910 may estimate the current image capturing direction information based on a change in the coarse location information received from the low-cost GPS module, and identify, in the visual feature map, the keypoints having the same/similar image capturing direction information as the corresponding image capturing direction information, and perform the feature matching with the captured image using the identified keypoints. In this case, the image capturing direction information of the vehicle 910 may be estimated based on existing movement information of the vehicle 910, based on the premise that the vehicle 910 moves according to a physical law. With such a configuration, the accuracy of estimating the location and posture of the vehicle 910 can be greatly enhanced.

While it has been described above that the vehicle 910 detects the keypoints from the captured image, extracts the visual feature descriptors of the detected keypoints, and compares the extracted visual feature descriptors with the visual feature descriptors in the visual feature map, aspects of the present invention are not limited thereto. For example, the vehicle 910 may transmit the captured image to an external device (e.g., the information processing system such as 220 of FIG. 2), and the external device may detect the keypoints in the received image, and extract the visual feature descriptors of the detected keypoints to estimate the location and posture of the vehicle 910. In addition, the vehicle 910 may continuously capture images while driving, and continuously perform location and posture estimation.

Figure 10:
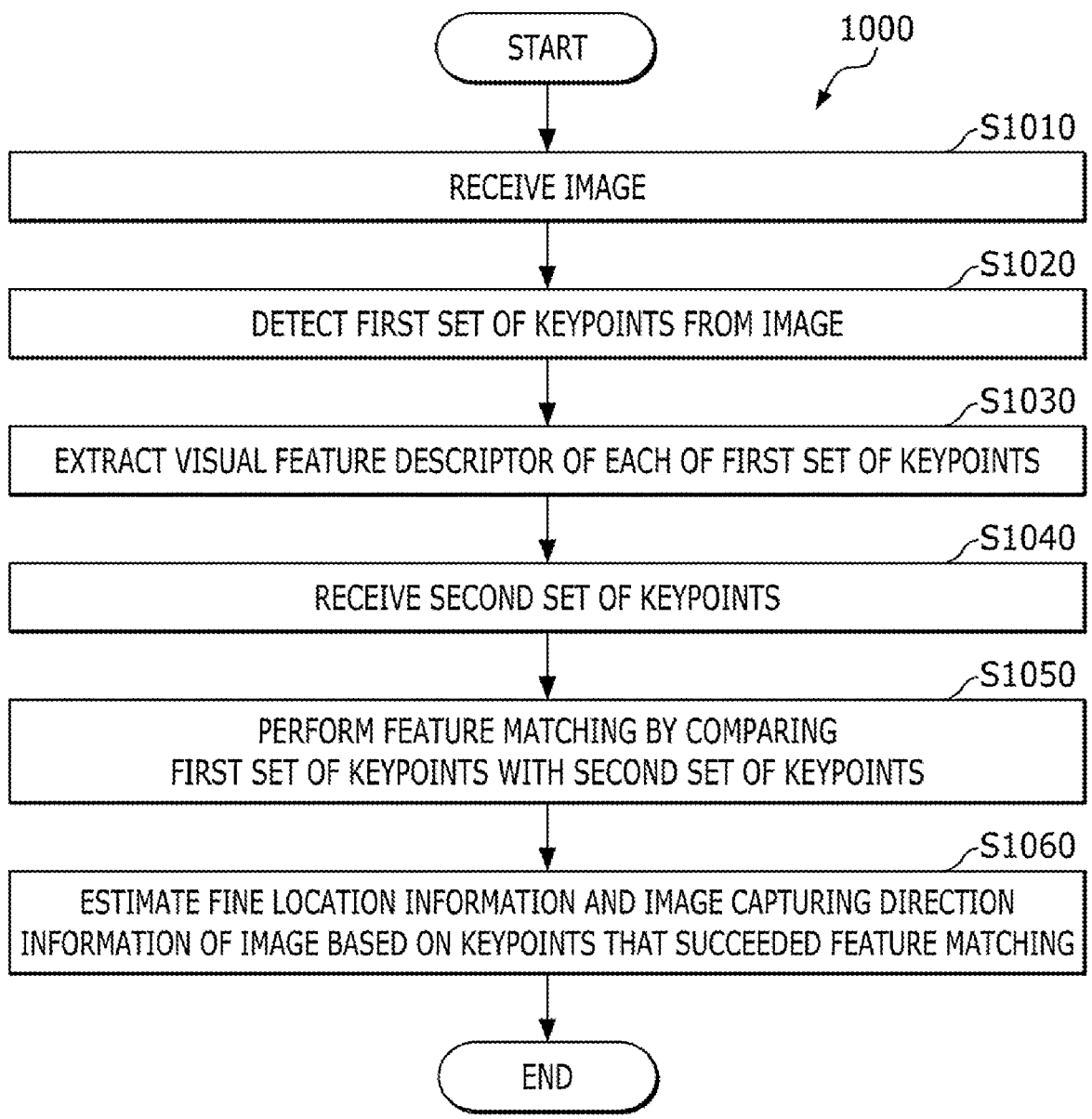
FIG. 10 is a flowchart illustrating an exemplary method for estimating a location and posture.

FIG. 10 is a flowchart illustrating an exemplary method 1000 for estimating a location and posture. The method 1000 for estimating the location and posture may be performed by the processor 314 of the vehicle 230. In another example, the method 1000 for estimating the location and posture may be performed by the processor 344 of the information processing system 220. In still another example, the information processing system 220 and the vehicle 230 may divide and perform the steps of the method 1000 for estimating the location and posture.

As illustrated, the method 1000 for estimating the location and posture may be initiated by the processor 314 receiving an image, at S1010. For example, the processor 314 may receive the image from an image sensor. The image may be an image captured by the vehicle 230 while driving.

In response to receiving the image, the processor 314 may detect a first set of keypoints from the image, at S1020. The processor 314 may detect a plurality of keypoints from the image, calculate a distinctiveness score of each of the detected plurality of keypoints, and identify, among the plurality of keypoints, the keypoints having a distinctiveness score equal to or greater than a preset threshold, thereby detecting the first set of keypoints. In addition, the processor 314 may extract a visual feature descriptor of each of the first set of keypoints, at S1030. In this case, the processor 314 may detect the keypoints in the image and extract the visual feature descriptors of the keypoints with the same method as the method used for generating the visual feature map.

The processor 314 may receive the pre-stored second set of keypoints (e.g., keypoints in the pre-stored visual feature map), at S1040. In this case, each of the second set of keypoints may include, associated with the same, a visual feature descriptor, a 3D coordinate value, image capturing direction information, and the like. The processor 314 may receive the coarse location information with the captured image, and estimate coarse image capturing direction information. The coarse image capturing direction information may be estimated based on a change in the coarse location information received from the GPS module during a predetermined time period before capturing an image. In this case, the processor 314 may extract the second set of keypoints from the visual feature map including the third set of keypoints, based on the coarse location information and the coarse image capturing direction information. In this case, each of the third set of keypoints may include, associated with the same, a visual feature descriptor, a 3D coordinate value, and image capturing direction information.

The processor 314 may perform feature matching by comparing the visual feature descriptors of the first set of keypoints with the visual feature descriptors of the second set of keypoints, at S1050. As a result of the feature matching, the processor 314 may estimate fine location information with the captured image and fine image capturing direction information of the image, based on the 3D coordinate values associated with the keypoints, of the second set of keypoints, which succeeded the feature matching, at S1060. In another example, the processor 314 may estimate the fine location information with the captured image and fine image capturing direction information of the image, based on the 3D coordinate values and the image capturing direction information associated with the keypoints, of the second set of keypoints, which succeeded the feature matching.

The method for generating the visual feature map and a method for estimating the location and posture described above may be provided as a computer program stored in a computer-readable recording medium for execution by a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for generating a visual feature map performed by one or more processors, said method comprising:
   receiving a first image;
   detecting a first set of keypoints from the first image;
   extracting a visual feature descriptor of each of the first set of keypoints;
   receiving a first set of 3D point cloud data associated with a location where the first image is captured;
   determining a 3D coordinate value of each of the first set of keypoints using the first set of 3D point cloud data;
   receiving a second image;
   detecting a second set of keypoints from the second image;
   extracting a visual feature descriptor of each of the second set of keypoints;
   receiving a second set of 3D point cloud data associated with a location where the second image is captured;
   determining a 3D coordinate value of each of the second set of keypoints using the second set of 3D point cloud data;
   performing first feature matching by comparing the visual feature descriptors of the first set of keypoints with the visual feature descriptors of the second set of keypoints; and
   generating a local map including keypoints, of the second set of keypoints, which succeeded the first feature matching;
   wherein the generating of the local map includes:
      receiving image capturing direction information of the second image; and associating the visual feature descriptors, the 3D coordinate values, and the image capturing direction information for each of the keypoints, of the second set of keypoints, which succeeded the first feature matching.

2. The method according to claim 1, wherein the receiving of the first set of 3D point cloud data includes:
acquiring geometric information of a surface of a road around the location where the first image is captured using a 2D light detection sensor and a ranging (LiDAR) sensor.

3. The method according to claim 2, wherein the receiving of the first set of 3D point cloud data includes:
acquiring geometric information of a non-road area around the location where the first image is captured using a 3D LiDAR sensor.

4. The method according to claim 1, wherein the detecting of the first set of keypoints from the first image includes:
detecting a plurality of keypoints from the first image;
identifying, among the plurality of keypoints, keypoints located within a preset distance from a location where the first image was captured; and
determining the identified keypoints as the first set of keypoints.

5. The method according to claim 1, wherein the detecting of the first set of keypoints from the first image includes:
detecting a plurality of keypoints from the first image;
calculating a distinctiveness score of each of the plurality of keypoints;
identifying, among the plurality of keypoints, keypoints having a distinctiveness score equal to or greater than a preset threshold; and
determining the identified keypoints as the first set of keypoints.

6. The method according to claim 1, further comprising:
receiving a third image;
detecting a third set of keypoints from the third image;
extracting a visual feature descriptor of each of the third set of keypoints;
receiving a third set of 3D point cloud data associated with a location where the third image is captured;
determining a 3D coordinate value of each of the third set of keypoints using the third set of 3D point cloud data;
performing second feature matching by comparing the visual feature descriptors of the third set of keypoints with the visual feature descriptors of the keypoints in the local map; and
updating the local map based on keypoints, of the third set of keypoints, which succeeded the second feature matching.

7. The method according to claim 6, wherein the updating of the local map includes:
calculating an average value of visual feature descriptors of a pair of keypoints that succeeded the second feature matching.

8. The method according to claim 6, further comprising:
performing third feature matching by comparing the visual feature descriptors of keypoints, of the third set of keypoints, which failed the second feature matching with the visual feature descriptors of the second set of keypoints; and
adding keypoints that succeeded the third feature matching to the local map.

9. A non-transitory computer-readable recording medium storing instructions that, when executed by one or more processors, cause performance of the method according to claim 1.

10. A method for generating a visual feature map performed by one or more processors, said method comprising:
receiving a first image;
detecting a first set of keypoints from the first image;
extracting a visual feature descriptor of each of the first set of keypoints;
receiving a first set of 3D point cloud data associated with a location where the first image is captured;
determining a 3D coordinate value of each of the first set of keypoints using the first set of 3D point cloud data;
receiving a second image;
detecting a second set of keypoints from the second image;
extracting a visual feature descriptor of each of the second set of keypoints;
receiving a second set of 3D point cloud data associated with a location where the second image is captured;
determining a 3D coordinate value of each of the second set of keypoints using the second set of 3D point cloud data;
performing first feature matching by comparing the visual feature descriptors of the first set of keypoints with the visual feature descriptors of the second set of keypoints;
generating a local map including keypoints, of the second set of keypoints, which succeeded the first feature matching;
receiving a third image;
detecting a third set of keypoints from the third image;
extracting a visual feature descriptor of each of the third set of keypoints;
receiving a third set of 3D point cloud data associated with a location where the third image is captured;
determining a 3D coordinate value of each of the third set of keypoints using the third set of 3D point cloud data;
performing second feature matching by comparing the visual feature descriptors of the third set of keypoints with the visual feature descriptors of the keypoints in the local map;
updating the local map based on keypoints, of the third set of keypoints, which succeeded the second feature matching; and
removing from the local map keypoints, of the keypoints included in the local map, which failed the feature matching a predetermined number of times or more.

11. A method for generating a visual feature map performed by one or more processors, said method comprising:
receiving a first image;
detecting a first set of keypoints from the first image;
extracting a visual feature descriptor of each of the first set of keypoints;
receiving a first set of 3D point cloud data associated with a location where the first image is captured;
determining a 3D coordinate value of each of the first set of keypoints using the first set of 3D point cloud data;
receiving a second image;
detecting a second set of keypoints from the second image;
extracting a visual feature descriptor of each of the second set of keypoints;
receiving a second set of 3D point cloud data associated with a location where the second image is captured;
determining a 3D coordinate value of each of the second set of keypoints using the second set of 3D point cloud data;

performing first feature matching by comparing the visual feature descriptors of the first set of keypoints with the visual feature descriptors of the second set of keypoints;

generating a local map including keypoints, of the second set of keypoints, which succeeded the first feature matching;

receiving a third image;

detecting a third set of keypoints from the third image;

extracting a visual feature descriptor of each of the third set of keypoints;

receiving a third set of 3D point cloud data associated with a location where the third image is captured;

determining a 3D coordinate value of each of the third set of keypoints using the third set of 3D point cloud data;

performing second feature matching by comparing the visual feature descriptors of the third set of keypoints with the visual feature descriptors of the keypoints in the local map;

updating the local map based on keypoints, of the third set of keypoints, which succeeded the second feature matching; and generating a global map based on keypoints, of the keypoints included in the local map, which succeeded the feature matching a predetermined number of times or more.

12. A method for estimating a location performed by one or more processors, said method comprising:

receiving an image;

detecting a first set of keypoints from the image;

extracting a visual feature descriptor of each of the first set of keypoints;

receiving a pre-stored second set of keypoints, wherein each of the second set of keypoints includes a visual feature descriptor and a 3D coordinate value, or the visual feature descriptor, the 3D coordinate value, and image capturing direction information;

performing feature matching by comparing the visual feature descriptors of the first set of keypoints with the visual feature descriptors of the second set of keypoints; and estimating fine location information of a location where the image is captured and fine image capturing direction information of the image, based on the 3D coordinate values associated with the keypoints, of the second set of keypoints, which succeeded the feature matching, or the 3D coordinate values and the image capturing direction information, wherein the receiving of the pre-stored second set of keypoints includes:

receiving coarse location information of the location where the image is captured;

estimating coarse image capturing direction information of the image; and extracting the second set of keypoints from a visual feature map including a third set of keypoints based on the coarse location information and the coarse image capturing direction information, wherein each of the third set of keypoints includes a visual feature descriptor, a 3D coordinate value, and image capturing direction information.

13. The method according to claim 12, wherein the coarse image capturing direction information is estimated based on a change in the coarse location information received from a GPS module during a predetermined time period before capturing the image.

14. The method according to claim 12, wherein the detecting of the first set of keypoints further includes:

detecting a plurality of keypoints from the image;

calculating a distinctiveness score of each of the plurality of keypoints;

identifying, among the plurality of keypoints, keypoints having a distinctiveness score equal to or greater than a preset threshold; and determining the identified keypoints as the first set of keypoints.

15. A non-transitory computer-readable recording medium storing instructions that, when executed by one or more processors, cause performance of the method according to claim 12.

16. A system for generating a visual feature map, including:

a memory; and one or more processors connected to the memory and configured to execute one or more computer-readable programs stored in the memory, wherein the one or more programs include instructions for:

receiving a first image;

detecting a first set of keypoints from the first image;

extracting a visual feature descriptor of each of the first set of keypoints;

receiving a first set of 3D point cloud data associated with a location where the first image is captured;

determining a 3D coordinate value of each of the first set of keypoints using the first set of 3D point cloud data;

receiving a second image:

detecting a second set of keypoints from the second image;

extracting a visual feature descriptor of each of the second set of keypoints;

receiving a second set of 3D point cloud data associated with a location where the second image is captured;

determining a 3D coordinate value of each of the second set of keypoints using the second set of 3D point cloud data;

performing first feature matching by comparing the visual feature descriptors of the first set of keypoints with the visual feature descriptors of the second set of keypoints;

generating a local map including keypoints, of the second set of keypoints, which succeeded the first feature matching;

receiving a third image;

detecting a third set of keypoints from the third image;

extracting a visual feature descriptor of each of the third set of keypoints;

receiving a third set of 3D point cloud data associated with a location where the third image is captured;

determining a 3D coordinate value of each of the third set of keypoints using the third set of 3D point cloud data;

performing second feature matching by comparing the visual feature descriptors of the third set of keypoints with the visual feature descriptors of the keypoints in the local map;

updating the local map based on keypoints, of the third set of keypoints, which succeeded the second feature matching;

performing third feature matching by comparing the visual feature descriptors of keypoints, of the third set of keypoints, which failed the second feature matching with the visual feature descriptors of the second set of keypoints; and adding keypoints that succeeded the third feature matching to the local map.

\* \* \* \* \*